(12) United States Patent
Nielsen

(10) Patent No.: US 10,687,454 B2
(45) Date of Patent: Jun. 23, 2020

(54) CARRIER ARM ASSEMBLY AND AGRICULTURAL MACHINE INCLUDING CARRIER ARM ASSEMBLY

(71) Applicant: Kverneland Group Kerteminde AS, Kerteminde (DK)

(72) Inventor: Rasmus Elmelund Nielsen, Gudbjerg (DK)

(73) Assignee: KVERNELAND GROUP KERTEMINDE AS, Kerteminde (DK)

( * ) Notice: Subject to any disclaimer, the term of this patent is extended or adjusted under 35 U.S.C. 154(b) by 138 days.

(21) Appl. No.: 15/773,125

(22) PCT Filed: Sep. 26, 2016

(86) PCT No.: PCT/EP2016/072877
§ 371 (c)(1),
(2) Date: May 2, 2018

(87) PCT Pub. No.: WO2017/076555
PCT Pub. Date: May 11, 2017

(65) Prior Publication Data
US 2018/0317373 A1 Nov. 8, 2018

(30) Foreign Application Priority Data

Nov. 4, 2015 (GB) .................................. 1519492.1

(51) Int. Cl.
*A01B 73/00* (2006.01)
*A01D 34/66* (2006.01)
*A01B 59/06* (2006.01)
*A01B 63/00* (2006.01)
*A01D 101/00* (2006.01)

(52) U.S. Cl.
CPC .............. *A01B 73/00* (2013.01); *A01B 59/06* (2013.01); *A01B 63/004* (2013.01);
(Continued)

(58) Field of Classification Search
CPC ..... A01B 73/00; A01B 63/008; A01B 63/004; A01B 59/06; A01B 63/10; A01B 63/023;
(Continued)

(56) References Cited

U.S. PATENT DOCUMENTS 3,221,482 A * 12/1965 Cowling .............. A01D 34/866
56/15.8
3,949,539 A * 4/1976 Cartner ................ A01D 75/185
56/10.4
(Continued)

FOREIGN PATENT DOCUMENTS

| CN | 203047020 U | 7/2013 |
|---|---|---|
| WO | 2010130265 A1 | 11/2010 |
| WO | 2015097230 A1 | 7/2015 |

OTHER PUBLICATIONS

International Search Report issued in connection with PCT Application No. PCT/EP2016/072877 dated Dec. 21, 2016.

*Primary Examiner* — Arpad Fabian-Kovacs
(74) *Attorney, Agent, or Firm* — Steven M. Shape; Dennemeyer & Associates, LLC

(57) ABSTRACT

A carrier arm assembly for an operating unit of an agricultural machine includes a carrier arm having a base part and an extending part that is telescopically adjustable relative to the base part to adjust the length of the carrier arm between an unextended configuration and an extended configuration. The base part and the extending part both include a set of bearing surfaces that are configured to enable sliding movement of the extending part relative to the base part. The bearing surfaces of the base part include upper inclined bearing surfaces and lower inclined bearing surfaces, and the bearing surfaces of the extending part include upper inclined bearing surfaces and lower inclined bearing surfaces, which
(Continued)

are configured to engage respectively the upper inclined bearing surfaces and the lower inclined bearing surfaces of the base part.

5 Claims, 7 Drawing Sheets

(52) U.S. Cl.
CPC .......... *A01B 63/008* (2013.01); *A01D 34/661* (2013.01); *A01D 2101/00* (2013.01)

(58) Field of Classification Search
CPC ..... A01B 63/02; A01B 63/002; A01B 59/063; B60D 1/155; A01D 34/661; A01D 2101/00; A01D 34/43
See application file for complete search history.

(56) References Cited

U.S. PATENT DOCUMENTS

| | | | | |
|---|---|---|---|---|
| 4,183,195 A * | 1/1980 | James | ................ | A01D 34/246 56/10.4 |
| 4,206,580 A * | 6/1980 | Truax | ................ | A01D 34/866 56/10.4 |
| 4,426,829 A * | 1/1984 | Johnson | ................ | A01D 34/866 56/10.4 |
| 4,502,269 A * | 3/1985 | Cartner | ................ | A01D 34/866 56/10.7 |
| 4,869,056 A * | 9/1989 | Lynch | ................ | A01D 34/866 56/15.2 |
| 4,873,818 A * | 10/1989 | Turner | ................ | A01D 34/866 56/10.8 |
| 4,996,830 A * | 3/1991 | Davison | ................ | A01D 34/866 56/14.7 |
| 5,004,203 A * | 4/1991 | Fabius | ................ | F16C 29/04 248/276.1 |
| 6,640,528 B1 * | 11/2003 | Rowland | ................ | A01D 34/866 56/15.2 |
| 7,523,601 B2 * | 4/2009 | Wolff | ................ | A01D 34/661 56/228 |
| 9,376,261 B1 * | 6/2016 | Miller | ................ | E01H 5/076 |
| 2017/0006760 A1 * | 1/2017 | Nielsen | ................ | A01D 34/661 |

* cited by examiner

SECTION B-B          SECTION C-C

CARRIER ARM ASSEMBLY AND AGRICULTURAL MACHINE INCLUDING CARRIER ARM ASSEMBLY

CROSS-REFERENCE TO RELATED APPLICATIONS

This is a 35 U.S.C. 371 National Stage Patent Application of International Application No. PCT/EP2016/072877, filed Sep. 26, 2016, which claims priority to United Kingdom application 1519492.1, filed Nov. 4, 2015, each of which is hereby incorporated by reference in its entirety.

The present invention relates to a carrier arm assembly for an operating unit of an agricultural machine. In an embodiment the invention relates to a carrier arm assembly for a cutter unit of an agricultural mowing machine. The invention also relates to an agricultural machine comprising a carrier vehicle, a carrier arm assembly for an operating unit and, optionally, an operating unit.

More generally, embodiments of the invention relate a carrier arm assembly for the operating units of various kinds of agricultural machine including, but not limited to, mowing machines, rakes, tedders, seeding machines and soil working machines, including disc harrows and cultivators. Further embodiments of the invention relate to a carrier arm assembly for an operating unit of an agricultural machine, where the operating unit is a cutter unit, a rake, a tedder, a seeding machine or a soil working machine.

A known type of agricultural mowing machine that may be used for harvesting hay, straw and similar crops has a cutter unit comprising a plurality of rotary cutter heads attached to a cutter bar. The cutter heads rotate about vertical axes and are provided with cutter blades that cut the crop. The rotary cutter heads may be of the disc-type or drum-type. The mowing machine may be a conditioning mowing machine that includes a plurality of flails for conditioning the cut crop, or a plain mowing machine that has no conditioning unit.

The operating unit may be carried by a carrier vehicle, for example a tractor. In the case of an agricultural mowing machine cutter units may be mounted on one or both sides of the carrier vehicle, each cutter unit being carried by a carrier arm assembly that is attached to the rear of the carrier vehicle and includes a carrier arm. The carrier arm assembly may include a pivot mechanism that allows the position of the carrier arm to be adjusted. The carrier arm may for example be located in a substantially horizontal working position in which the cutter unit is positioned close to the ground to cut the crop, or an upright transport position in which the cutter unit is lifted behind the cab of the vehicle, allowing the vehicle to travel along a road. It may also be possible to raise the carrier arm and the cutter unit to a headland position in which the cutter unit is lifted a small distance above the working position, allowing the tractor to turn when it reaches the headland.

Other types of agricultural machine including rakes, tedders, seeding machines and soil working machines may be mounted in a similar manner with an operating unit (a rake, tedder, seeding machine or soil working machine) mounted on one or both sides of a carrier vehicle and carried by a carrier arm assembly that is attached to the rear of the carrier vehicle and includes a carrier arm. Again, the carrier arm assembly may include a pivot mechanism that allows the position of the carrier arm to be adjusted. The carrier arm may be located in a working position in which the operating unit is positioned close to the ground or a transport position in which the operating unit is lifted behind the cab of the carrier vehicle, allowing the carrier vehicle to travel along a road. The carrier arm or the operating unit may also be raised to a headland position in which the operating unit is lifted a small distance above the working position, allowing the carrier vehicle to turn when it reaches the headland.

A mowing machine of the general type described above is disclosed in DE29614199U1. A cutter unit is suspended from the end of a carrier arm through a pivot joint, which is located centrally between the ends of the cutter unit. The pivot joint has a pivot axis that extends parallel to the working direction of the mowing machine and the cutter unit can rotate about this axis during use, allowing it to follow the contours of the ground. The carrier arm can be lifted from the cutting position to a travelling position in which the cutter unit is carried behind the tractor.

A disadvantage with the mowing machine described in DE29614199U1 is that it does not allow for sideshift (sideways movement of the mowing unit) relative to the axis of the tractor. Sideshift may be useful either when setting the machine up, for example to provide different operating widths, or to allow lateral adjustment of the cutter unit relative to the tractor during mowing, for example to ensure a constant overlap with a previously cut strip.

Also, if the cutter unit strikes an obstacle on the ground during a mowing operation this can cause the cutter unit to twist about a substantially vertical axis, placing a strain on the pivot joint and possibly leading to damage or failure of the pivot mechanism. The problem is particularly acute if the cutter unit strikes an obstacle near to one of its ends.

Also, it is not possible to adjust the height of the cutter unit relative to the carrier arm. Therefore, when working on uneven ground any vertical movement of the cutter unit relative to the tractor has to be accommodated by movement of the carrier arm, which places significant loads on any energy accumulators (for example springs or hydraulic bladders) associated with the arm.

US2009/0293439A1 describes a grass mowing machine with multiple cutting units, wherein the rear cutting units are mounted on an adjustable width toolbar having a centre section and left and right outer sections that telescope into the centre section. The cutting units are mounted to lift arms that are pivotably mounted to outboard ends of the left and right outer sections.

A problem associated with the use of a telescopic adjustable width toolbar as described for example in US2009/0293439A1 is that there can be a certain amount of play between the left and right outer sections of the toolbar and the fixed centre section, which can cause some variation in the positions of the operating units carried by the toolbar. To reduce the amount of play the centre and outer sections may be made to very tight tolerances or a clamping mechanism may be provided to clamp the outer sections in the chosen width configurations. However, these measures may make it more difficult and/or more time consuming to adjust the width of the tool bar, and they may not be easily adapted for use with a telescopic carrier arm assembly, particularly where the length of the carrier arm is adjusted by an actuator rather than by manual adjustment.

Similar problems arise with other types of agricultural machine that are carried by a carrier arm assembly that includes a carrier arm attached to the rear of a tractor.

It is an object of the present invention to provide a carrier arm assembly for an operating unit of an agricultural machine that mitigates one or more of the aforesaid problems, or that provides one or more improvements over known carrier arm assemblies.

According to one aspect of the present invention there is provided a carrier arm assembly for an operating unit of an agricultural machine, the carrier arm assembly including a carrier arm having a base part and an extending part that is telescopically adjustable relative to the base part to adjust the length of the carrier arm between an unextended configuration and an extended configuration, wherein the base part and the extending part both include a set of bearing surfaces that are configured to enable sliding movement of the extending part relative to the base part, wherein the bearing surfaces of the base part include upper inclined bearing surfaces and lower inclined bearing surfaces, and the bearing surfaces of the extending part include upper inclined bearing surfaces and lower inclined bearing surfaces, which are configured to engage respectively the upper inclined bearing surfaces and the lower inclined bearing surfaces of the base part.

The inclined bearing surfaces of the base part and the extending part cooperate to substantially eliminate play between the base part and the extending part. The need for very tight tolerances between the base part and the extending part is greatly reduced, thus reducing the complexity of the machine, reducing or eliminating set-up processes and improving performance and reliability of the carrier arm assembly.

In an embodiment the upper and lower inclined bearing surfaces of the base part and the extending part are each inclined relative to the vertical at an angle in the range 30° to 60°, preferably 35° to 55°, more preferably 40° to 50°. These ranges of angles provide an optimum balance of operating characteristics, providing for minimal play between the base part and the extending part of the carrier arm without excessively increasing the friction between the base part and the extending part as the length of the carrier arm is adjusted.

In an embodiment at least one of the bearing surfaces comprises a layer of bearing material attached to the base part and/or the extending part of the carrier arm. The bearing material may for example be a layer of a low friction plastics material or a another bearing material having suitable low friction, load bearing characteristics, including both dry bearing materials and lubricated bearing materials.

In an embodiment, the carrier arm includes an actuator that drives the extending part to adjust the length of the carrier arm. The actuator may for example be a hydraulic actuator.

In an embodiment, the carrier arm assembly further comprises a mounting structure for mounting the carrier arm on a carrier vehicle.

In an embodiment, the carrier arm assembly further comprises a pivot mechanism that enables pivoting movement of the carrier arm relative to the mounting structure. The pivot mechanism enables movement of the carrier arm between a working position and a transport position in which the operating unit is located behind the cab of the carrier vehicle. The carrier arm assembly may include a drive mechanism for driving pivoting movement of the carrier arm, allowing it to be moved easily between the different positions. The pivot mechanism may be configured to provide for pivoting movement of the carrier arm between an upright position and a lowered working position in which the arm extends substantially parallel to the ground. The upright position allows the operating unit to be stowed behind the cab of the carrier vehicle for transportation along roads or through narrow gateways/doorways.

The carrier arm may include an actuator that drives the extending part to adjust the length of the carrier arm, allowing the position of the operating unit to be adjusted laterally relative to the carrier vehicle. For example, if the operating unit is a cutter unit, this makes it possible to adjust the operating position of the cutter unit during a mowing operation, for example to ensure that the edge of the cut strip of crop is aligned correctly with the edge of a strip cut previously. Adjustment of the lateral position of the cutter unit may be carried out manually, automatically or semi-automatically, for example using an operating method as described in EP1321027B1.

In an embodiment, the first actuator is connected between a first mount that is attached to the mounting structure and a second mount that is attached to the base part of the arm, and the second actuator is connected between the second mount and a third mount that is attached to the extending part of the arm. The use of a shared second mount that is connected to both the first actuator and the second actuator means that only three mounts are required in total for the two actuators, thus simplifying the structure of the carrier arm. The arrangement is also mechanically efficient.

In an embodiment, the carrier arm assembly includes a suspension system for suspending an operating unit from the carrier arm. In an embodiment the suspension system includes a mounting structure for the operating unit and two pairs of connecting rods, comprising an upper pair of connecting rods and a lower pair of connecting rods, each said connecting rod being attached via joints to the mounting structure and the carrier arm, wherein a first pair of said upper and lower pairs of connecting rods diverge in a working direction of the operating unit and a second pair of said upper and lower pairs of connecting rods converge in a working direction of the operating unit.

The suspension system allows the operating unit to be suspended solely from its centre point, thus permitting pendular movement of the operating unit and enabling the operating unit to follow the contours of the ground. The suspension system is also stronger and less vulnerable to damage from striking obstacles on the ground than the simple pivot used in the mowing machine described in DE 29614199U1.

The suspension system allows the operating unit to move vertically relative to the carrier arm. This movement may be accommodated, for example, by an actuator or spring. Vertical movement of the operating unit, as caused for example by movement over uneven ground, can be accommodated without adjusting any energy accumulators associated with the carrier arm, regardless of the length of the arm. The suspension system operates independently of any mechanism for adjusting the position or length of the carrier arm, thereby simplifying operation of the machine.

The suspension system allows the height of the operating unit relative to the arm to be adjusted, for example by means of an actuator or spring, which can be located centrally on the rotation axis so that it does not affect pendular motion of the operating unit when working.

Furthermore, when the mowing machine is raised to a transport position, the operating unit will naturally adopt a stable position under the force of gravity. The stability of the operating unit when it is in this position may be increased by the providing an actuator or spring that exerts a self-righting force on the operating unit. This actuator/spring is preferably connected to the carrier arm at a point higher than the virtual axis of rotation of the operating unit when it is in a raised position so that it increases the stability of the operating unit.

In an embodiment, the suspension system includes a support mechanism that supports the weight of the operating unit. The support mechanism may be located at the free end of the carrier arm, allowing the operating unit to move vertically relative to the arm and reducing or eliminating the need for the arm to pivot during working to accommodate undulations in the ground. This reduces the load on the energy accumulators associated with the arm and allows the energy level of the energy accumulators to be adjusted directly so as to influence the behaviour of the support mechanism, regardless of the position or length of the carrier arm.

The support mechanism may include an actuator for adjusting the height of the operating unit relative to the carrier arm. This allows the height of the operating unit to be adjusted easily, for example between a working position and a headland position, or in the case of a mowing machine between different cutting positions providing different cutting heights. Preferably, the actuator is configured to act between the carrier arm and the mounting structure of the operating unit.

The support mechanism may optionally include a resilient support element or elements configured to support at least part of the weight of the operating unit. Each resilient support element is preferably configured to act between the carrier arm and the mounting structure of the operating unit. Alternatively, the resilient support elements may be omitted and the weight of the operating unit may be supported entirely by an actuator, for example a hydraulic actuator, which may optionally be coupled to a hydraulic accumulator.

In an embodiment the upper pair of connecting rods lie in an upper plane and the lower pair of connecting rods lie in a lower plane. In one preferred embodiment a line normal to the upper plane and a line normal to the lower plane are substantially perpendicular to a width axis of the operating unit. Preferably, the upper plane is substantially parallel to the lower plane. This arrangement ensures that the operating unit is held upright and does not rotate about a horizontal axis as it moves in a vertical direction relative to the carrier arm.

The carrier arm assembly may be supplied with an operating unit for attachment to an existing carrier vehicle. Alternatively, the carrier arm assembly may be used for retrofitting to an existing operating unit.

According to another aspect of the invention there is provided an agricultural machine including a carrier arm assembly according to any one of the preceding statements of invention, a carrier vehicle and an operating unit, wherein the carrier arm assembly is mounted on the carrier vehicle and carries the operating unit. Alternatively, the carrier vehicle may carry two operating units and two carrier assemblies, mounted on both sides of the carrier vehicle.

In one preferred embodiment, the agricultural machine is a mowing machine and the operating unit is a cutter unit. The cutter unit preferably includes a plurality of rotary cutter heads mounted on a cutter bar or support frame.

An embodiment of the invention will now be described by way of example with reference to the accompanying drawings, in which.

Figure 1:
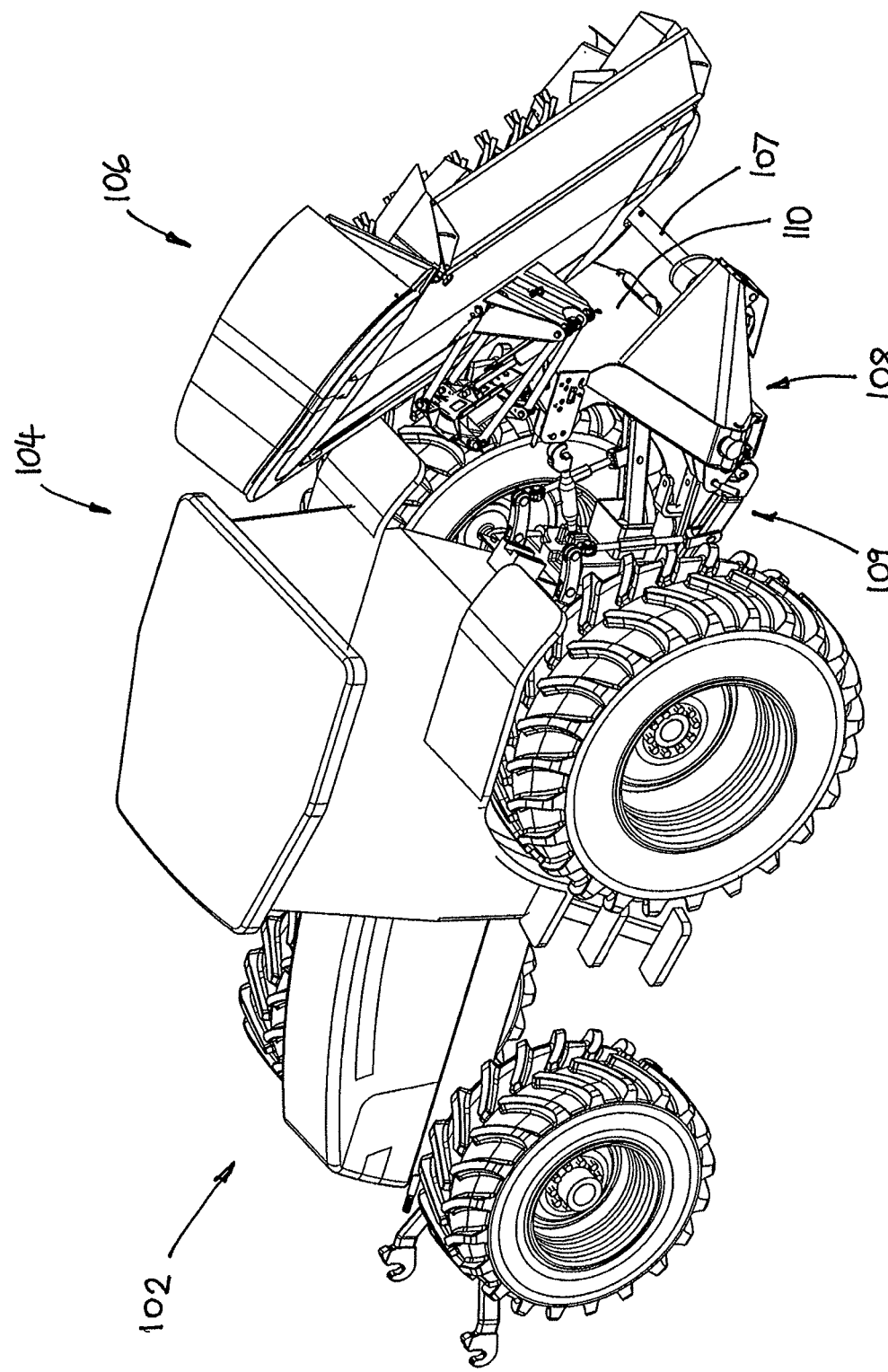
FIG. 1 is an isometric view of a mowing machine that includes a carrier arm assembly according to an embodiment of the invention, a carrier vehicle and a cutter unit, shown in a transport position.
Figure 2:
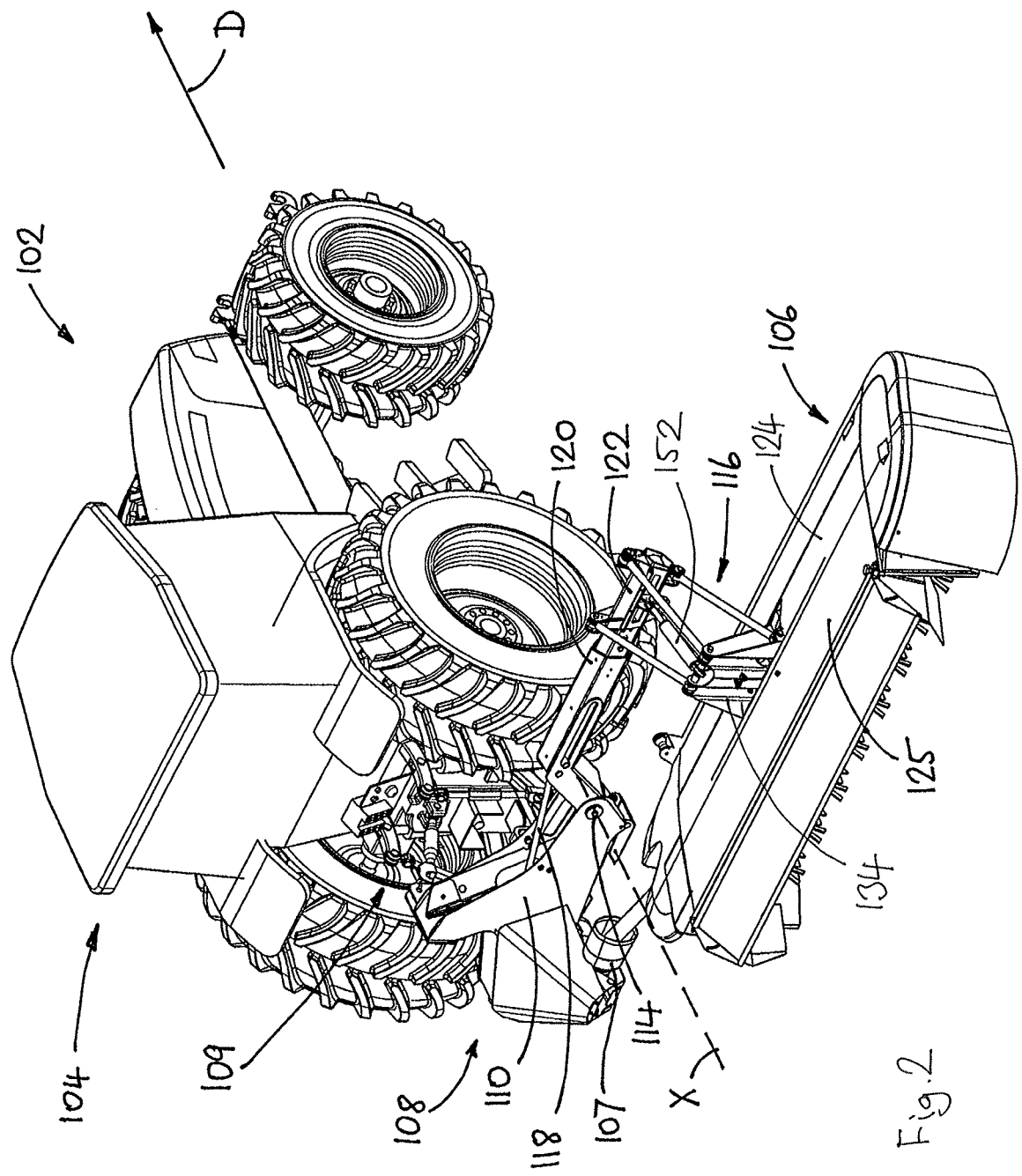
FIG. 2 is an isometric view of the mowing machine of FIG. 1, with the carrier arm assembly shown in a working position.

FIGS. 1 and 2 depict an agricultural machine 102 comprising a carrier vehicle (or tractor) 104, an operating unit 106 and a carrier arm assembly 108, which is attached to the rear of the carrier vehicle 104 through a conventional three-point mounting system 109. In this embodiment the agricultural machine 102 is a mowing machine, the carrier vehicle 104 is a tractor, and the operating unit 106 is a cutter unit. It should be understood however that the invention is also applicable to other kinds of agricultural machine including rakes, tedders, seeding machines and soil working machines, in which the cutter unit 106 is replaced by another operating unit of an appropriate type. The operating unit 106 is driven from the power take off of the vehicle 104 through a drive shaft 107.

The carrier arm assembly 108 includes a mounting structure 110 that is attached to the tractor's three-point mounting system 109, a carrier arm 112 that is attached to the mounting structure 110 through a pivot mechanism 114, and a suspension system 116 through which the cutter unit 106 is suspended from the free end of the carrier arm 112. In this embodiment the carrier arm 112 includes an inner section 112a that is connected to the pivot 114 and an outer section 112b that extends outwards to the free end of the arm and is set at an angle of about 40° relative to the inner section 112a.

The pivot mechanism 114 allows the carrier arm 112 to be pivoted about a pivot axis X that extends substantially parallel to the working direction D of the cutter unit 106. An actuator 118, for example a hydraulic ram, can be activated to drive rotation of the carrier arm 112 about the pivot axis X. The carrier arm 112 can generally be pivoted through a pivot angle in the range approximately 120° to 150° between a working position in which the outer section 112b of the arm is substantially horizontal, and a substantially upright transport position.

Figure 3:
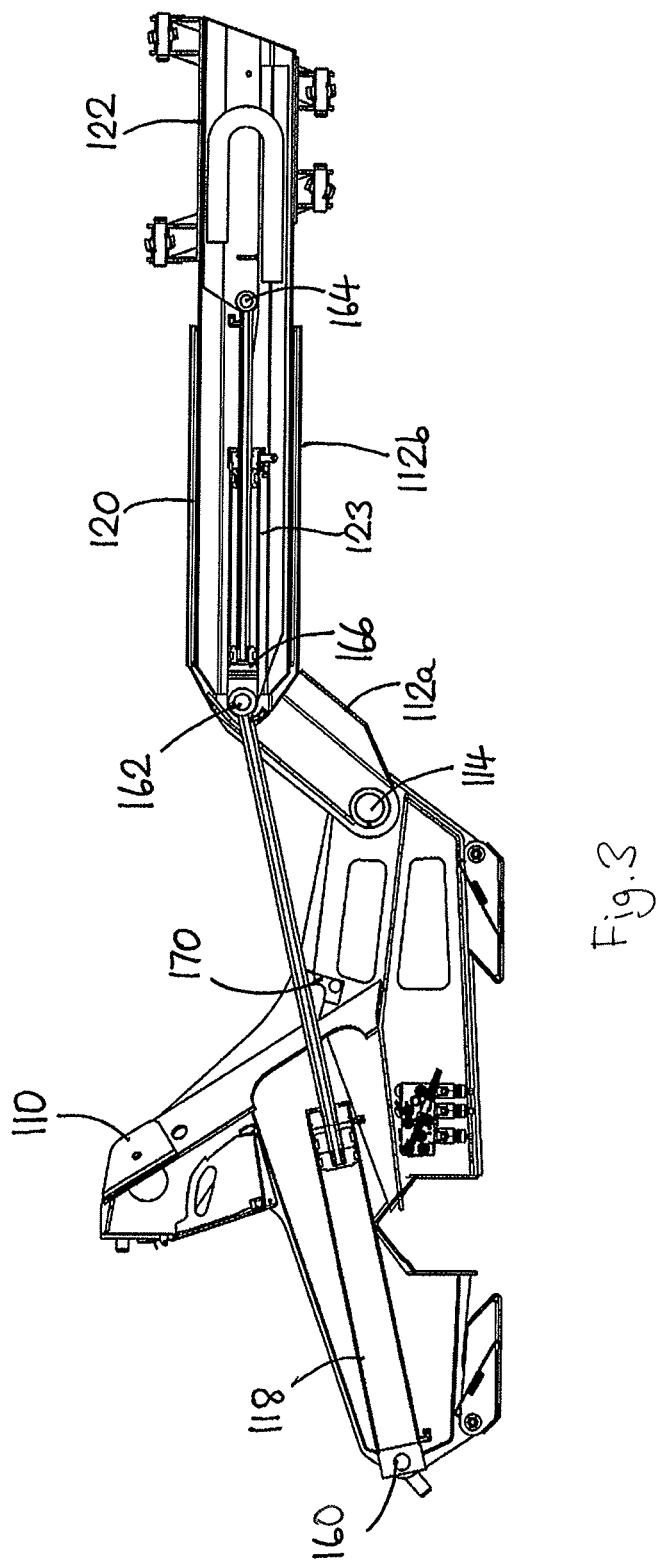
FIG. 3 is a sectional view of the carrier arm assembly, shown in a working condition.
Figure 4A:
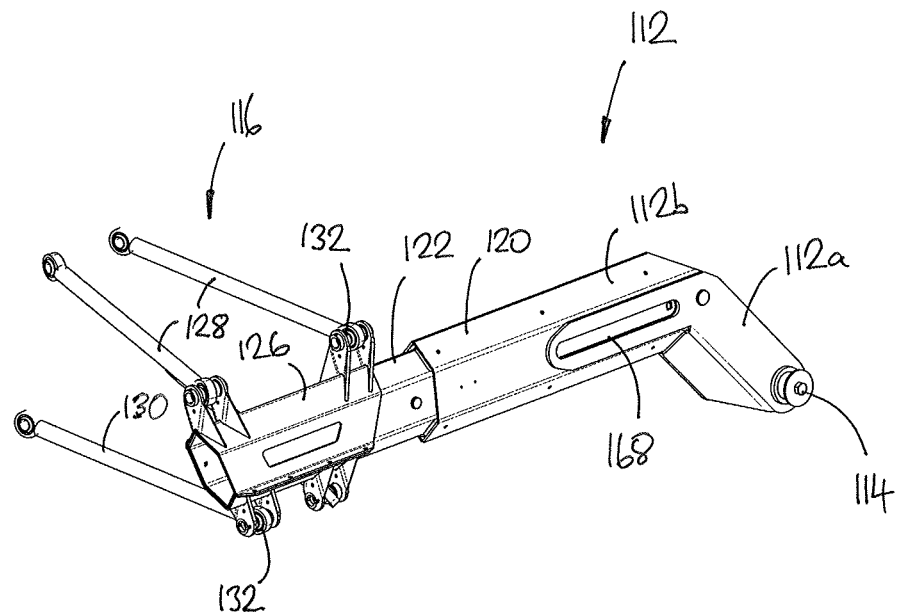
FIGS. 4a and 4b are isometric front views of a carrier arm in unextended and extended conditions.
Figure 4B:
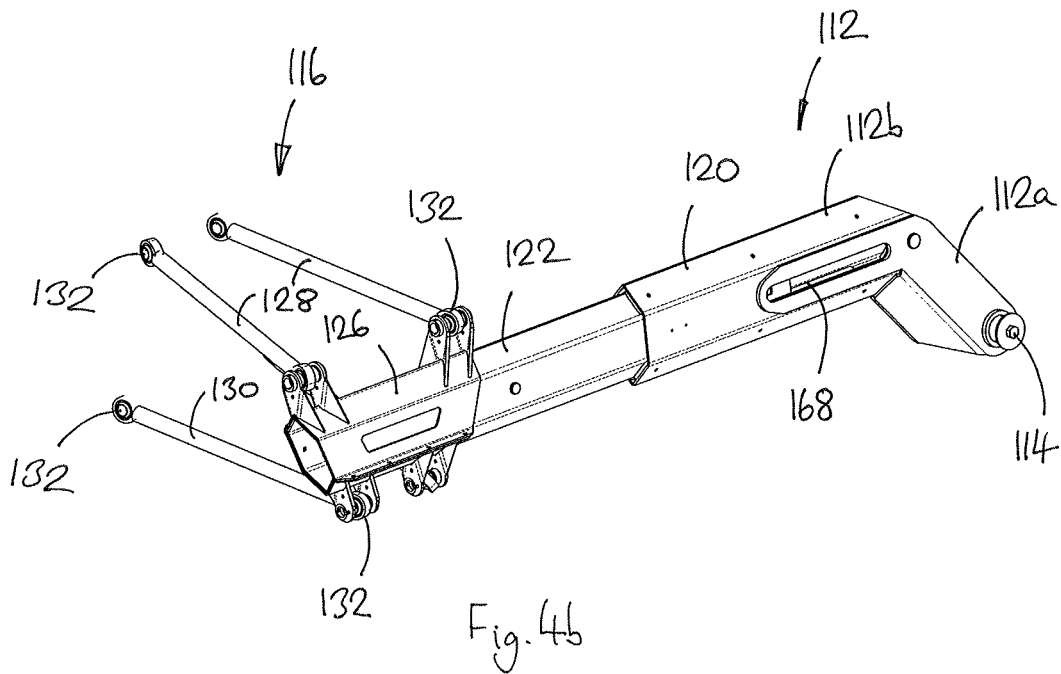
Figure 5A:
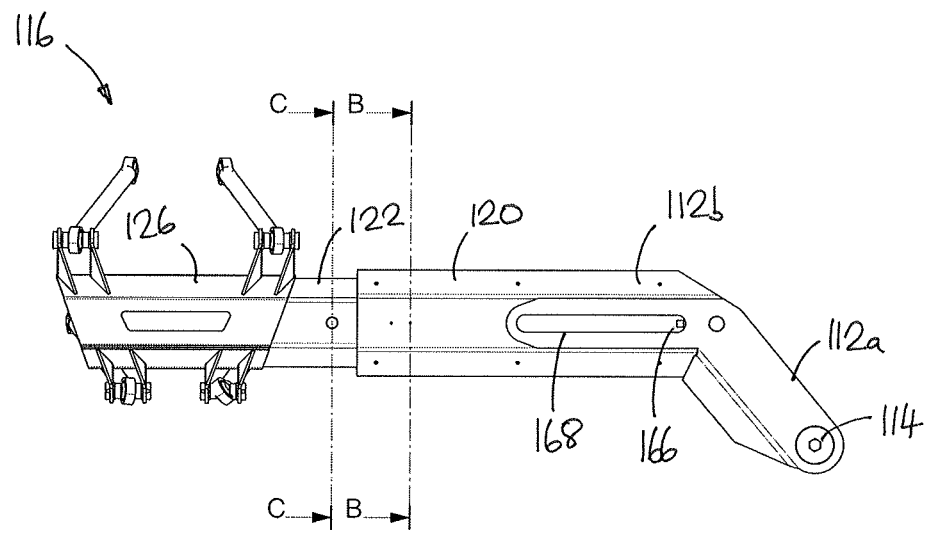
FIGS. 5a and 5b are front elevations of the carrier arm in unextended and extended conditions.
Figure 5B:
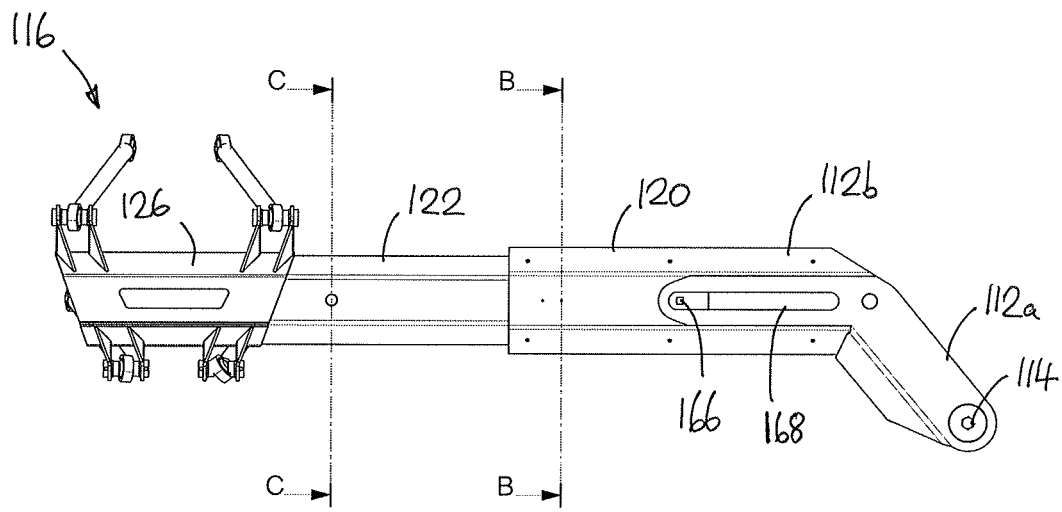
Figure 6A:
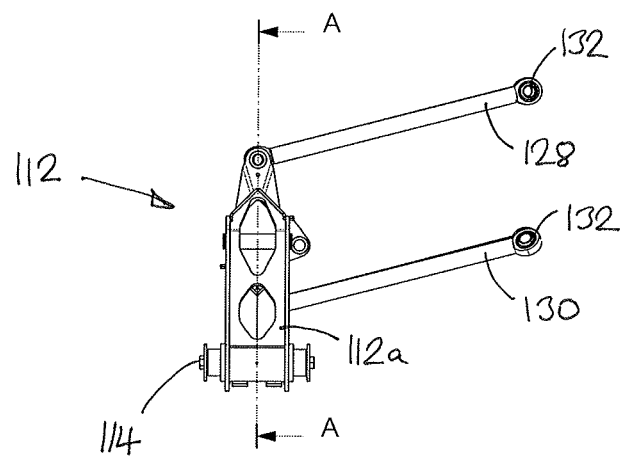
FIG. 6a is an end view of the carrier arm, seen from the inner end.
Figures 6B, 6C:
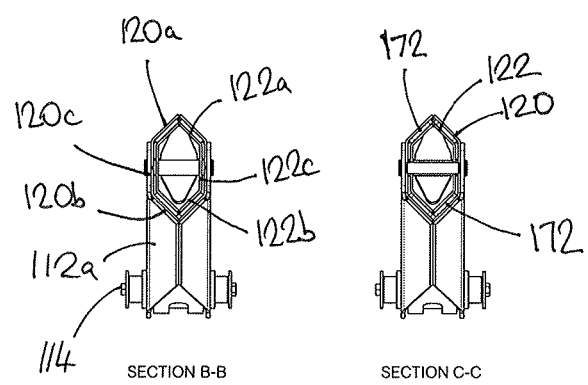
FIGS. 6b and 6c are cross-sections on lines B-B and C-C of FIGS. 5a and 5b.
Figure 7A:
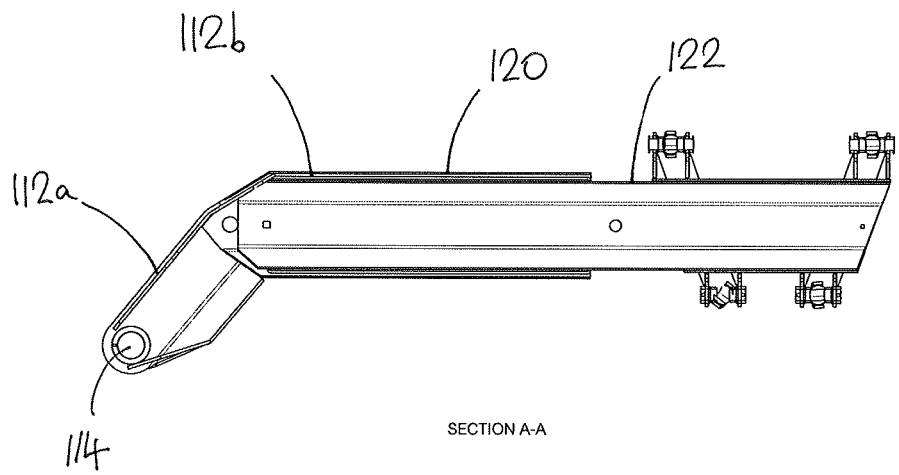
FIGS. 7a and 7b are sectional view of the carrier arm in unextended and extended conditions.
Figure 7B:
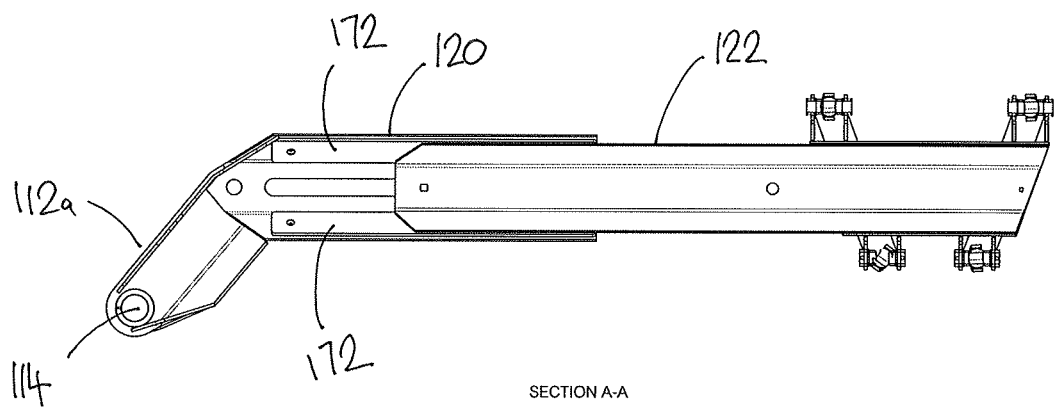

In FIG. 1 the mowing machine is shown in a transport configuration in which the carrier arm 112 is lifted to an upright position so that the cutter unit 106 is located behind the cab of the tractor 104, while in FIG. 2 the carrier arm 112 is shown in a working position in which the outer section 12b of the carrier arm 112 and the cutter unit 106 are substantially parallel to the ground. In FIG. 3 the carrier arm 112 is shown in a headland position in which the cutter unit 106 is raised slightly above the working position. The cutter unit 106 is moved to the headland position by raising the carrier arm 112 slightly, for example through a pivot angle of about 15°, and at the same time lifting the cutter unit 106 relative to the carrier arm 112 by adjusting the suspension system 116. This is described in more detail below.

As shown in FIGS. 4-7, the outer section 112b of the carrier arm includes a base part 120 and an extending part 122 that can be extended telescopically relative to the base part 120 to adjust the lateral position of the cutter unit 106 relative to the tractor 104. The structure and operation of the telescopic carrier arm 112 is described in more detail below.

Telescopic extension and retraction of the outer section is controlled by an actuator 123, for example a hydraulic ram, which is located within the base part 120 of the carrier arm 112 as shown in FIG. 3. The telescopic carrier arm 112 thus allows for sideshift movement of the cutter unit 106 relative to the tractor 104. This allows the operating position of the cutter unit 106 to be adjusted laterally relative to the centreline of the tractor 104. This makes it possible to adjust the operating position of the cutter unit 106 during a mowing operation, for example to ensure that the edge of the cut strip of crop is aligned correctly with the edge of a strip that has been cut previously, or to adjust the amount of overlap between the two strips. Adjustment of the lateral position of the cutter unit 106 may be carried out manually, automatically or semi-automatically, for example using an operating method as described in EP1321027B1.

The cutter unit 106 is largely conventional and includes a plurality of cutter heads (not shown) attached to a support frame 124, and an optional conditioning unit 125 for conditioning the crop cut by the cutter heads. The cutter unit 106 is driven via a drive shaft 107 from the power take-off unit of the tractor 104.

The cutter unit 106 is suspended from the free end of the carrier arm 112 by the suspension system 116. The suspension system 116 includes a bracket 126 that is attached to the free end of the carrier arm 112, and two pairs of connecting rods, comprising a pair of upper connecting rods 128 and a pair of lower connecting rods 130. The connecting rods 128, 130 all extend approximately in the working direction D of the mowing machine and are attached at their front ends via ball joints 132 to the carrier arm 112.

The rear end of each connecting rod 128,130 is attached via a spherical ball joint 132 to a mounting structure 134 that extends upwards from the support frame 124 of the cutter unit 106 and is located approximately centrally with respect to the working width of the cutter unit. The ball joints 132 at the rear ends of the connecting rods 128,130 lie in a first plane referred to herein as the mo-unit plane. The ball joints 132 at the rear ends of the upper connecting rods 128 are positioned more closely together than the ball joints 132 at the rear ends of the lower connecting rods 130.

The forward end of each connecting rod 128, 130 is attached via a second spherical ball joint 132 to the bracket 126 that is attached to the free end of the carrier arm 112. The second ball joints 132 lie in a second plane referred to herein as the frame plane. The ball joints at the forward ends of the lower connecting rods 130 are positioned more closely together than the ball joints at the forward ends of the upper connecting rods 128.

The connecting rods 128, 130 form a pair of four-bar linkages, which control movement of the cutter unit 106 relative to the carrier arm 112. In this embodiment the upper connecting rods 128 lie in an upper plane and the lower connecting rods lie in a lower plane, which is parallel to the upper plane. This arrangement allows the cutter unit 106 to move substantially vertically relative to the carrier arm 112 while maintaining the cutter unit in an upright position (i.e. without rotation of the cutter unit about a horizontal axis). Alternatively, the upper and lower planes may be non-parallel, in which case vertical movement of the cutter unit relative to the carrier arm will cause a degree of rotation of the cutter unit 106 about a horizontal axis, which may be permissible in certain applications.

As explained above, the ends of the upper connecting rods 128 are closer together in the mo-plane than the frame plane, and the upper connecting rods 128 therefore converge from the frame plane towards mo-plane. Conversely, the ends of the lower connecting rods 130 are further apart in the mo-plane than the frame plane and the lower connecting rods 130 therefore diverge from the frame plane to the mo-plane. The upper and lower connecting rods 128, 130 therefore act like reversed A-frames, which prevent horizontal movement of the cutter unit 116 relative to the carrier arm 112.

Because the connecting rods 128, 130 are connected to the carrier arm 112 and the mounting structure 134 of the cutter unit 106 via ball joints, the cutter unit 106 is able to rotate relative to the carrier arm about an axis of rotation that extends approximately in the working direction D of the cutter unit. This allows the cutter unit to follow the contours of the ground while working.

It should be understood that the connecting rod arrangement may be inverted, whereby the upper pair of connecting rods 128 diverge from the frame plane to the mo-plane and the lower pair of arms 130 converge from the frame plane to the mo-plane. This does not affect operation of the suspension system 116.

The suspension system 116 also includes an actuator 152 for adjusting the height of the cutter unit 106 relative to the carrier arm 112. In this example, the actuator 152 comprises a hydraulic ram that extends from a first pivot point between the rear ends of the upper connecting rods 128 to a second pivot point between the forward ends of the lower connecting rods 130.

The suspension system 116 allows the height of the cutter unit 106 relative to the carrier arm 112 to be adjusted and allows the cutter unit to rotate about an axis that extends substantially in the working direction D, but does not allow the cutter unit 106 to move laterally relative to the carrier arm (i.e. in a direction that is parallel to the width of the cutter unit). The cutter unit 106 can therefore rotate to accommodate undulations in the surface of the ground. The height of the cutter unit 106 relative to the carrier arm 112 can also be adjusted either to adjust the height of cut of the cutter unit, or to allow the cutter unit to be positioned in a raised headland position as shown in FIG. 3 that allows the tractor to perform a turn at the end of a field.

The suspension system 116 allows the cutter head 106 to move vertically relative to the arm 112. Vertical movement of the cutter head 106 can be accommodated without adjusting any energy accumulators associated with the carrier arm 112, regardless of the length of the arm. The suspension system 116 thus operates independently of any sideshift mechanism for adjusting the length of the carrier arm 112, or the pivot angle of the arm 112 about pivot axis 114, thereby simplifying operation of the machine.

Because the connecting rods 128, 130 are subjected in use only to linear forces (i.e. forces of compression or tension that act along the axes of the connecting rods) and do not experience any bending forces they can be relatively light in weight. At the same time, the risk of damage to the suspension system when the cutter unit collides with an obstruction on the ground is substantially reduced.

When the mowing machine is in the transport configuration shown in FIG. 1, the suspension system 116 supports the entire weight of the cutter unit 106 but prevents movement of the cutter unit in the width direction of the cutter unit. The cutter unit 106 can however move under gravity to a stable position relative to the carrier arm 112. This prevents unwanted movement of the cutter unit 106 during transportation along a road.

Returning to FIG. 3, the carrier arm assembly 108 includes drive mechanism for adjusting the pivot angle of the carrier arm 112 about pivot joint 114, and for adjusting the telescopic extension of the carrier arm 112. This drive mechanism will now be described in more detail. The drive mechanism includes a first actuator 118 for adjusting the pivot angle of the arm 112 about the axis X of pivot joint 114, and a second actuator 123 for adjusting the length of the arm 112. The first and second actuators 118, 123 may for example be hydraulic rams.

The first actuator 118, also called the folding cylinder, is connected between a first mount 160, for example a pivot pin, which is attached to the mounting structure 110, and a second mount 162, for example a second pivot pin, which is attached to the base part 120 of the arm 112 at the junction of the inner section 112a and the outer section 112b. Extension of the first actuator 118 drives the carrier arm 112 downwards towards the working position, and retraction of the first actuator 118 lifts the carrier arm 112 upwards towards the transport position. In the headland position the arm 112 is lifted only slightly above the working position: for example, the arm 112 may be rotated about the pivot joint 114 through an angle in the range 5°-15° above the working position. The support structure 116 may also be raised when the arm is in the headland position, to increase the clearance between the cutter unit 106 and the ground.

The first actuator 118 is preferably configured to allow stepless adjustment of the pivot angle of the carrier arm 112. This enables the possibility of making small adjustments to the angle of the carrier arm 112, for example to compensate for a loss of pressure in one or more tyres of the carrier vehicle 104. The carrier arm 112 can therefore be maintained in a horizontal position, even if the carrier vehicle is tilting slightly to one side. The term "stepless" as used here is intended to cover both truly stepless adjustments and pseudo-stepless adjustments (i.e. very small finite adjustments) of the length of the actuator 118.

The second actuator 123, also called the sideshift cylinder, is connected between the second mount 162 that is attached to the base part 120 of the arm 112, and a third mount 164 that is attached to the extending part 122 of the arm 112. It should be noted that the second mount 162 is common to the first actuator 118 and the second actuator 123, thus simplifying the mechanical complexity of the carrier arm. Extension of the second actuator 118 drives the extending part 122 of the carrier arm 112 outwards, increasing the length of the arm, and retraction of the second actuator 118 draws the extending part 122 inwards, decreasing the length of the carrier arm 112.

The extending part 122 of the carrier arm 112 is provided at its inner end with a guide pin 166 that extends outwards through guide slots 168 in the sides of the base part 120 of the arm. The guide pin 166 and the guide slots 168 help to guide movement of the extending part 122 as the arm 112 extends and retracts.

The structure of the telescopic carrier arm 112 is shown most clearly in FIGS. 4-7. The outer section 112b of the carrier arm includes a base part 120 and an extending part 122 that can be extended telescopically relative to the base part 120 to adjust the length of the carrier arm 112 and the lateral position of the cutter unit 106 relative to the tractor 104. The base part 120 and the extending part 122 both have a similar cross-sectional shape, in this embodiment each comprising a six-sided shape having a pair of inclined upper walls 120a, 122a, a pair of inclined lower walls 120b,122b and a pair of upright side walls 120c,122c. The extending part 122 is slightly smaller in its cross-sectional dimensions so that it can slide telescopically within the base part 120. Slide bearings 172, for example comprising sheets of a low friction material such as PTFE, are attached to the inner surfaces of the upper and lower inclined walls 120a,120b of the base part 120 and engage the outer surfaces of the upper and lower inclined walls 122a,122b of the extending part 122. These slide bearings ensure smooth, low friction sliding of the extending part 122 relative to the base part 120.

The upper and lower inclined walls 120a,120b of the base part 120 and upper and lower inclined walls 122a,122b of the extending part 122 together provide a guiding function, which ensures that play between the base part 120 and the extending part 122 of the arm is minimised, even when the arm 112 is in a fully-extended condition. The weight of an operating unit attached to the outer end of the telescopic carrier arm produces a bending moment on the arm 112, which forces the inner end of the extending part 122 upwards and the outer end of the extending part 122 downwards relative to the base part 120. This produces a self-centring effect which prevents side-to-side movement of the extending part 122 relative to the base part 120.

It should be understood that the base and extending parts 120, 122 of the carrier arm 112 may alternatively have a number different profiles without affecting operation of the invention. For example, the side walls 120c, 122c may be omitted so that the base past 120 and the extending part 122 of the carrier arm both have a diamond-shaped profile. In the illustrated embodiment the upper and lower inclined walls 120a,120b of the base part 120 and the upper and lower inclined walls 122a,122b of the extending part 122 are all inclined at an angle of about 45° relative to the vertical. However, they may alternatively be inclined at some other angle, for example in the range 30° to 60° relative to the vertical.

Various modifications of the apparatus described above are of course possible. For example, the arrangement of the connecting rods 128, 130 of the suspension mechanism 116 may be reversed, so that the upper connecting rods 128 diverge from the frame plane towards the mo-plane and the lower connecting rods 130 converge from the frame plane to the mo-plane. The ball joints 132 may also be replaced by any other joints that allow rotation about two orthogonal axes, including for example universal joints (Cardan joints).

The hydraulic actuator 152 may be replaced by any other suitable actuator including, for example, an electric linear motor or a motor driven screw. Alternatively, the actuator 152 may be omitted entirely and the weight of the cutter unit may then be supported by resilient support elements, for example springs or other resilient components.

The suspension mechanism may alternatively be replaced any other suitable mechanism for attaching the operating unit to the carrier arm.

As previously indicated, the invention is not limited to mowing machines but is also applicable to other kinds of agricultural machine including rakes, tedders, seeding machines and soil working machines in which an operating unit is attached to the rear of a tractor 104.

The carrier arm assembly can be used to mount a single operating unit on one side of a carrier vehicle, or alternatively two operating units may be used to mount operating units on both sides of the vehicle.

The invention claimed is:

1. A carrier arm assembly for an operating unit of an agricultural machine, the carrier arm assembly comprising:
   a carrier arm;
   a mounting structure mounting the carrier arm on a carrier vehicle, the carrier arm having a pivot mechanism such that the carrier arm is pivotably movable relative to the mounting structure;
   a first actuator configured to drive a pivoting movement of the carrier arm between a working position and a transport position;

a suspension system suspending an operating unit from the carrier arm;

a second actuator configured to adjust a height of the operating unit relative to the carrier arm, the carrier arm having a base part and an extending part telescopically adjustable relative to the base part to adjust a length of the carrier arm between an unextended configuration and an extended configuration; and a third actuator configured to drive the extending part to adjust the length of the carrier arm, wherein the base part includes a set of first bearing surfaces and the extending part includes a set of second bearing surfaces providing sliding movement of the extending part relative to the base part, wherein the set of first bearing surfaces includes first upper inclined bearing surfaces and first lower inclined bearing surfaces, and the set of second bearing surfaces includes second upper inclined bearing surfaces and second lower inclined bearing surfaces, which engage respectively the first upper inclined bearing surfaces and the first lower inclined bearing surfaces, wherein each of the first upper inclined bearing surfaces, the first lower inclined bearing surfaces, the second upper inclined bearing surfaces, and the second lower inclined bearing surfaces is inclined relative to a vertical line at an angle of 40° to 50°.

2. A carrier arm assembly according to claim 1, wherein at least one of the bearing surfaces comprises a layer of bearing material attached to the base part or the extending part of the carrier arm.

3. A carrier arm assembly according to claim 1, wherein the suspension system includes a mounting structure for the operating unit and two pairs of connecting rods, comprising an upper pair of connecting rods and a lower pair of connecting rods, each said connecting rod being attached via joints to the mounting structure and the carrier arm, wherein a first pair of said upper and lower pairs of connecting rods diverge in a working direction of the operating unit and a second pair of said upper and lower pairs of connecting rods converge in a working direction of the operating unit.

4. An agricultural machine including a carrier arm assembly, a carrier vehicle and an operating unit, wherein the carrier arm assembly is mounted on the carrier vehicle and carries the operating unit, the carrier arm assembly comprising:

a carrier arm;

a mounting structure mounting the carrier arm on a carrier vehicle;

a pivot mechanism providing pivoting movement of the carrier arm relative to the mounting structure;

a first actuator configured to drive a pivoting movement of the carrier arm between a working position and a transport position;

a suspension system suspending the operating unit from the carrier arm;

a second actuator configured to adjust a height of the operating unit relative to the carrier arm, the carrier arm having a base part and an extending part telescopically adjustable relative to the base part to adjust a length of the carrier arm between an unextended configuration and an extended configuration; and a third actuator configured to drive the extending part to adjust the length of the carrier arm, wherein the base part includes a set of first bearing surfaces and the extending part includes a set of second bearing surfaces providing sliding movement of the extending part relative to the base part, wherein the set of first bearing surfaces includes first upper inclined bearing surfaces and first lower inclined bearing surfaces, and the set of second bearing surfaces includes second upper inclined bearing surfaces and second lower inclined bearing surfaces, which engage respectively the first upper inclined bearing surfaces and the first lower inclined bearing surfaces, wherein each of the first upper inclined bearing surfaces, the first lower inclined bearing surfaces, the second upper inclined bearing surfaces, and the second lower inclined bearing surfaces is inclined relative to a vertical line at an angle of 40° to 50°.

5. An agricultural machine according to claim 4, wherein the agricultural machine is a mowing machine and the operating unit is a cutter unit.

* * * * *